United States Patent [19]

Shutt

[11] 4,133,565
[45] Jan. 9, 1979

[54] FITTING EMPLOYING FLEXIBLE PLASTIC TUBING WITH ROLLED BACK END

[76] Inventor: George V. Shutt, 918 Willow Springs La., Glendora, Calif. 91740

[21] Appl. No.: 818,524

[22] Filed: Jul. 25, 1977

[51] Int. Cl.² ............................................. F16L 25/00
[52] U.S. Cl. .................................................. 285/334.5
[58] Field of Search .................. 285/334.5, 332, 332.1, 285/423, DIG. 20, DIG. 24; 138/DIG. 7; 403/334

[56] References Cited

U.S. PATENT DOCUMENTS

| | | | |
|---|---|---|---|
| 431,816 | 7/1890 | Lomasney | 285/334.5 |
| 509,743 | 11/1893 | Lane | 285/334.5 |
| 1,987,100 | 1/1935 | Dick | 285/334.5 |
| 2,900,200 | 8/1959 | Umstadter | 285/334.5 |
| 3,269,756 | 8/1966 | Bloom | 285/334.5 |
| 3,501,171 | 3/1970 | Baron | 285/334.5 |
| 3,815,940 | 6/1974 | Luckenbill | 285/423 |
| 3,961,814 | 6/1976 | Byrne et al. | 285/423 |
| 3,972,548 | 8/1976 | Roseen | 285/423 |

FOREIGN PATENT DOCUMENTS 547776  10/1922  France ................................. 285/334.5

Primary Examiner—Mervin Stein
Assistant Examiner—Carl Pietruszka
Attorney, Agent, or Firm—William W. Haefliger

[57] ABSTRACT

A beaded plastic tubing joint comprises:
(a) relative flexible and tough plastic tubing having a rolled end portion forming a bead, said plastic being a high molecular weight polymer with characteristics of polybutylene, and
(b) relatively rigid annular structure at opposite sides of the bead and pressurizing the bead annularly and through the wall thickness thereof to form an annular seal, and to retain the bead in position.

6 Claims, 28 Drawing Figures

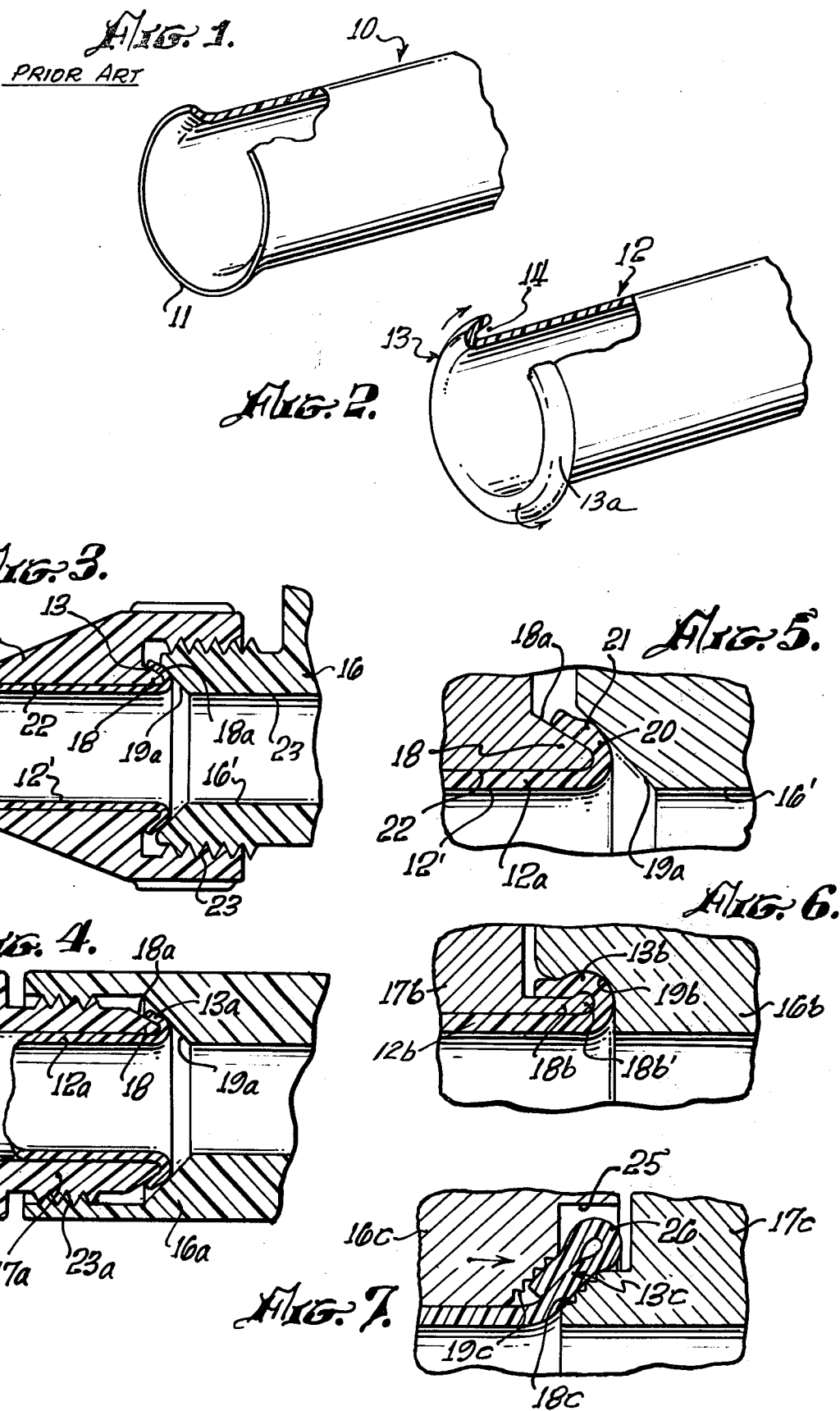

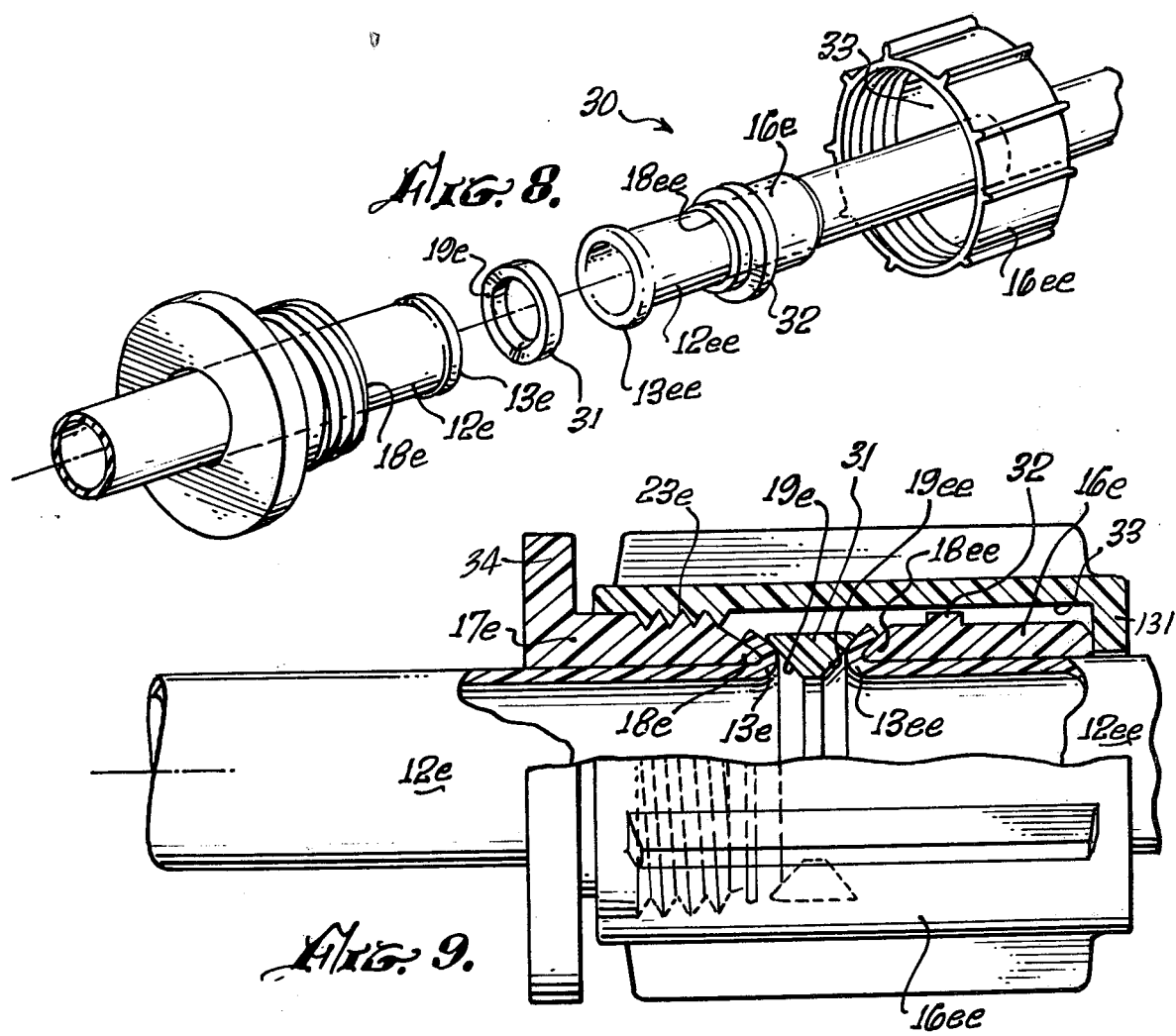
FIG. 8.
FIG. 9.
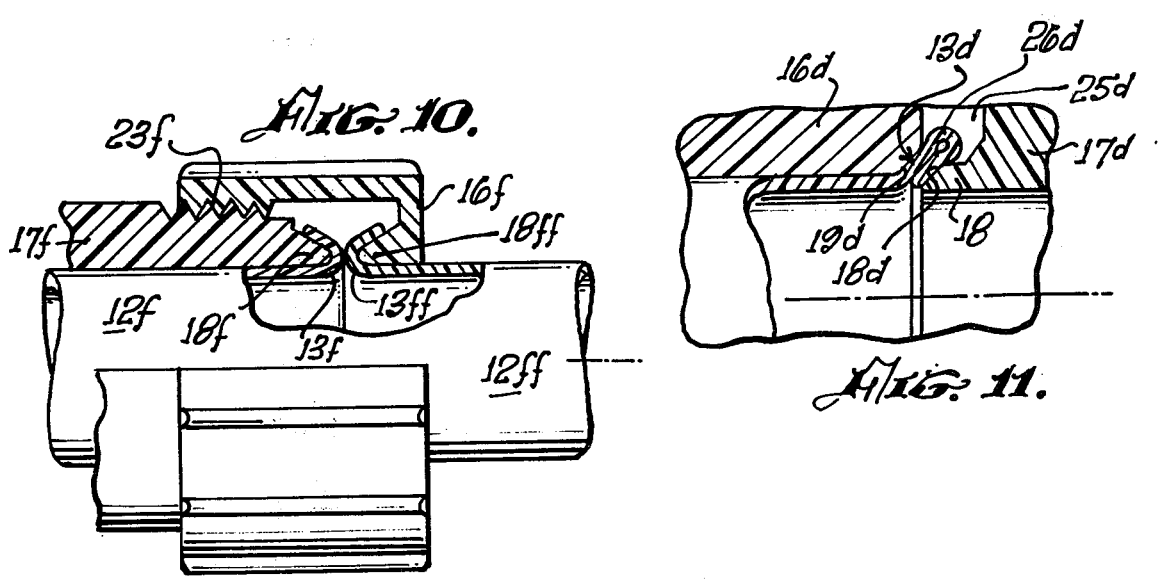
FIG. 10.
FIG. 11.

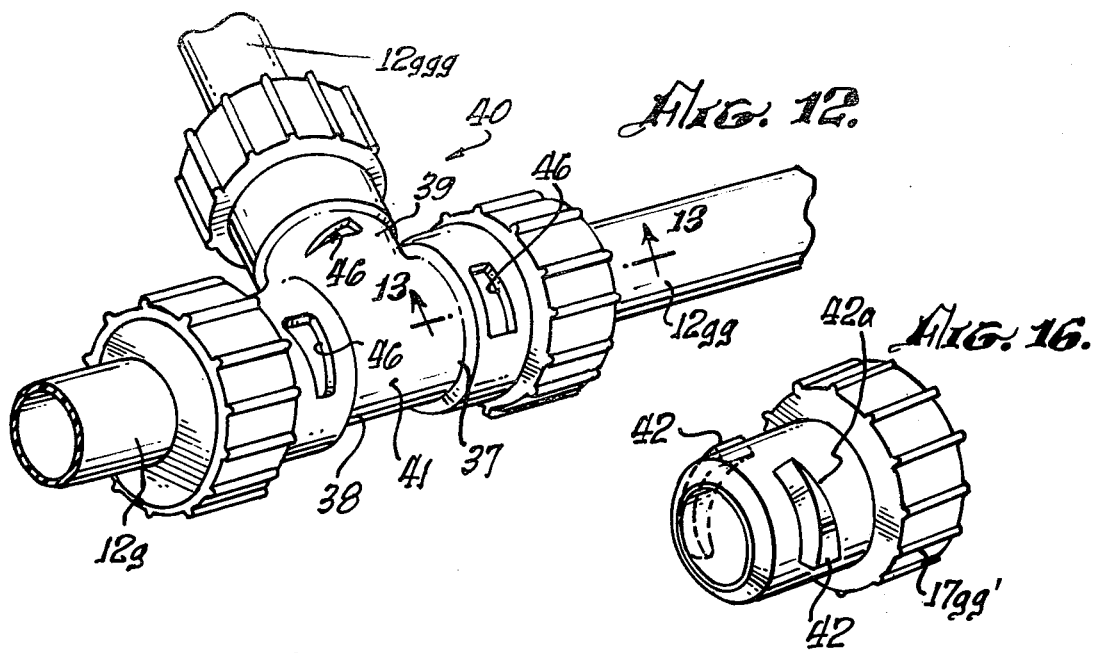
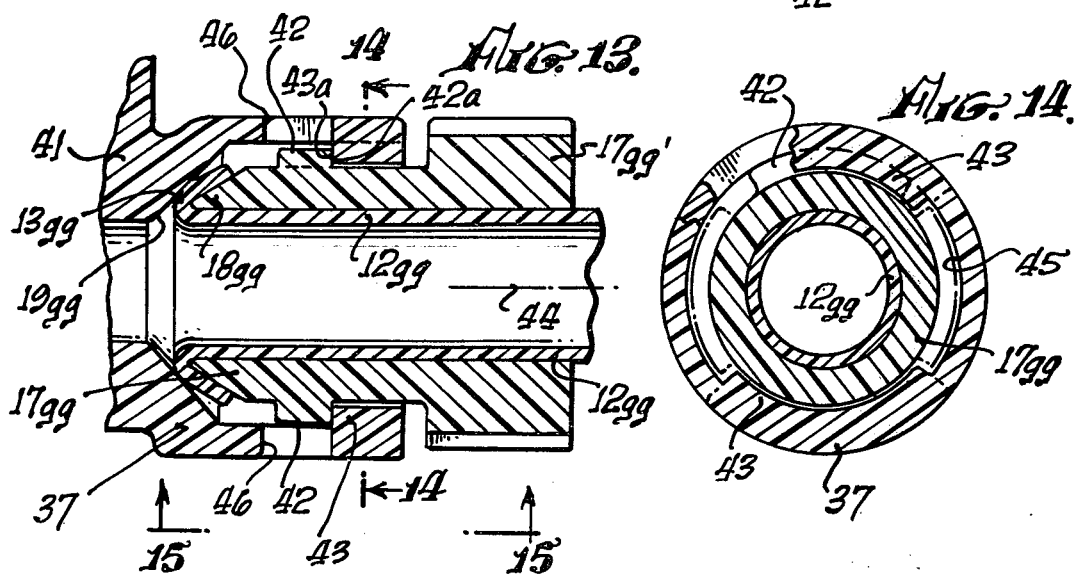
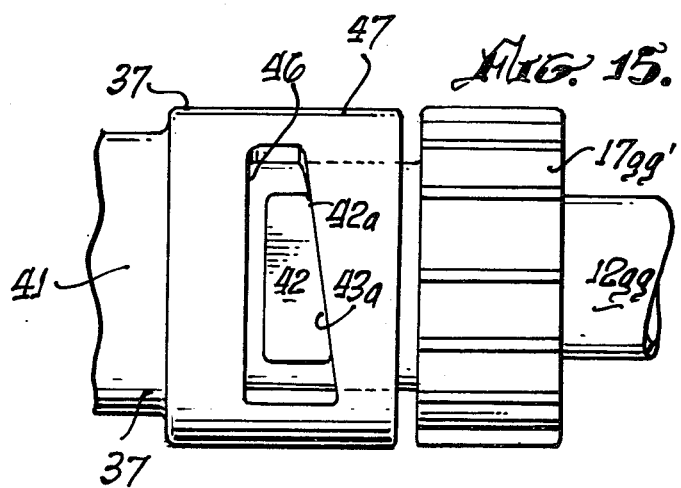

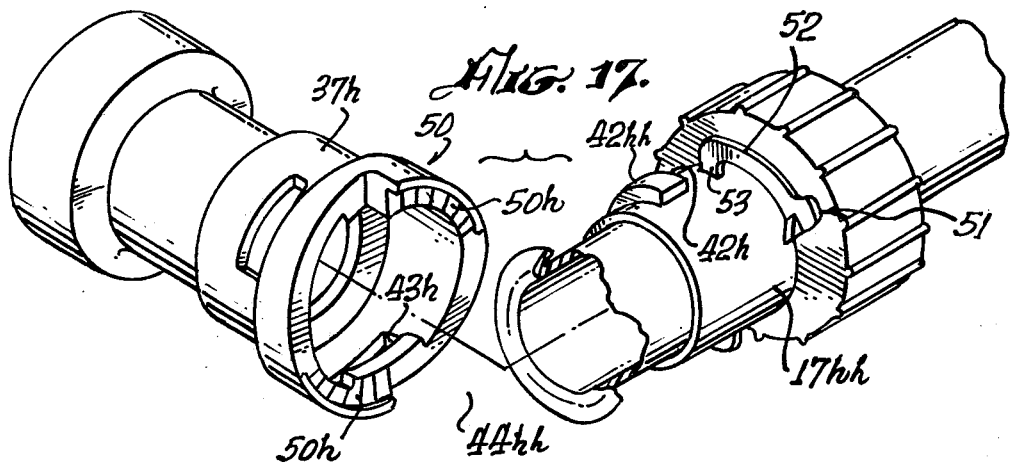
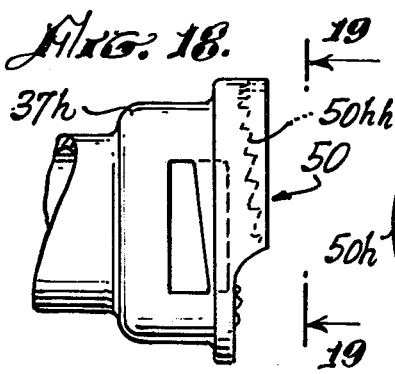
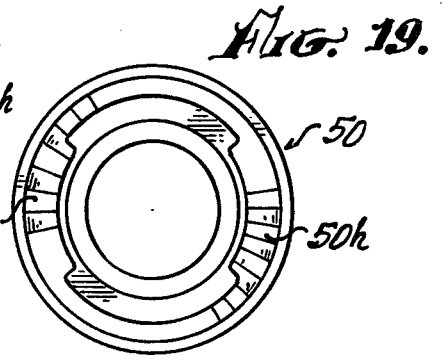
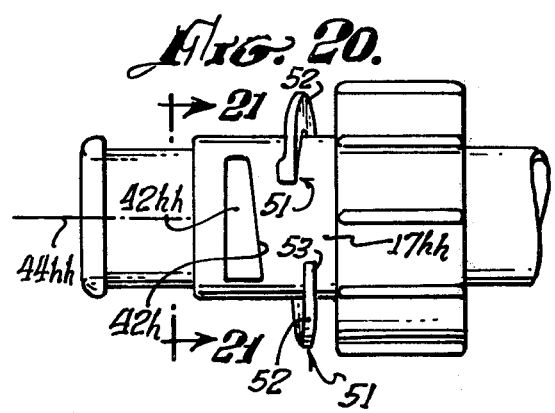
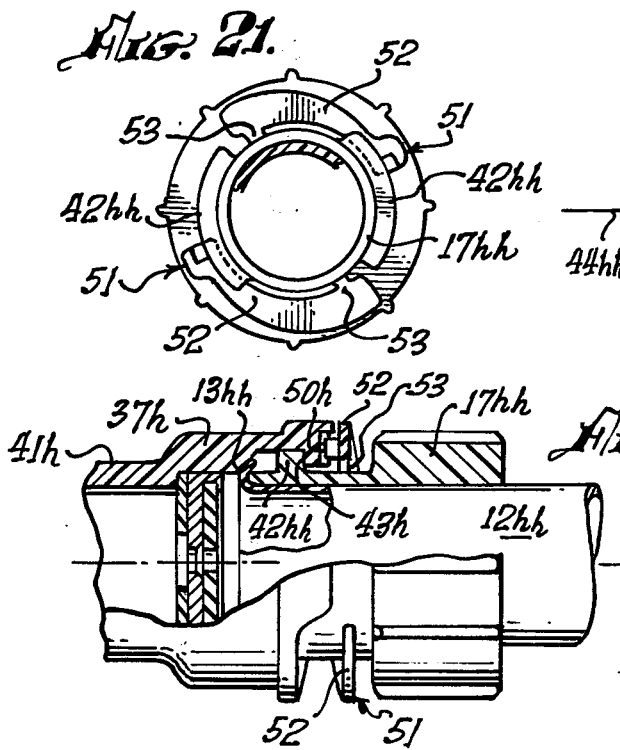

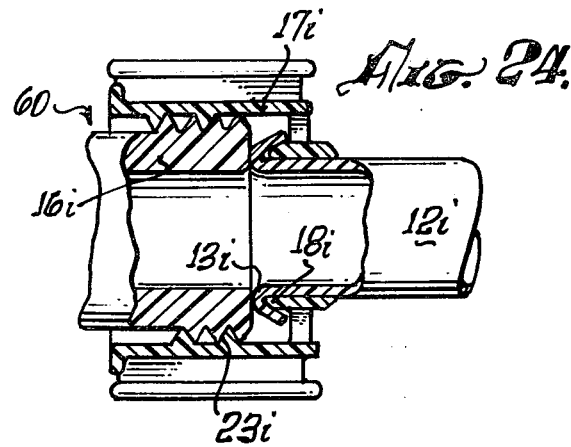
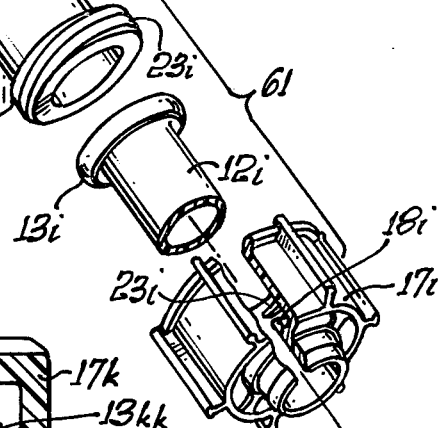
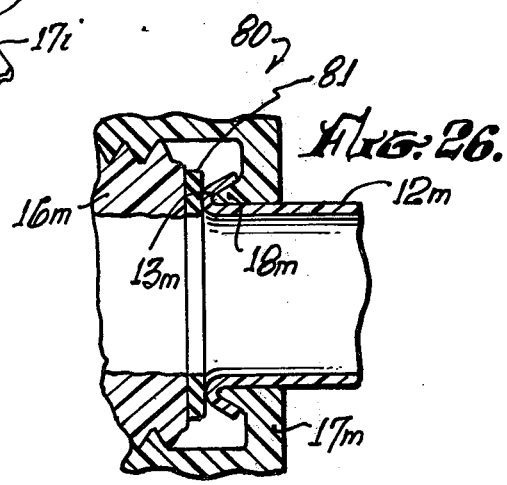
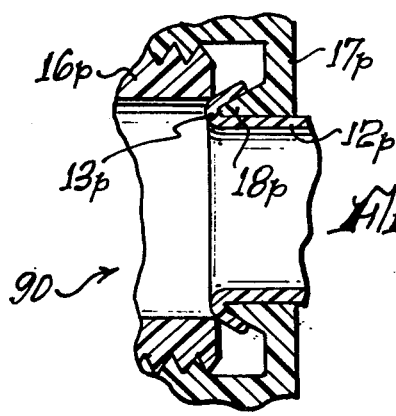
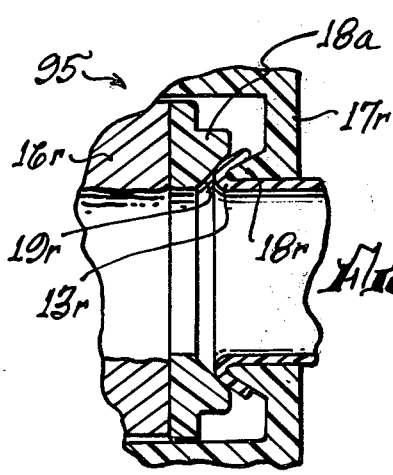

FITTING EMPLOYING FLEXIBLE PLASTIC TUBING WITH ROLLED BACK END

BACKGROUND OF THE INVENTION

This invention relates generally to tube fittings, and more particularly concerns fittings for beaded plastic tubing joints where the plastic material is flexible, and consists for example of polybutylene.

Tubing made of polybutylene has many desirable characteristics among which are: very high strength from cold up to about 180° F., and extremely high stress crack resistance and weather resistance, while remaining very flexible. Further, elongation characteristics are so high that water can freeze in pipe made of this material, with no damage to the pipe. Also, life expectancy of the material is very high. Such pipe and tubing is usable in many areas where copper tubing has been used, and at a fraction of the cost of the latter.

In certain applications, namely where high fluid pressure is encountered, it was found that adequate clamping of the tubing was required. For example, the tubing ends were typically forced over annular serrations on pipe nipples, and external clamping members were employed over the tubing ends. This requires extra work and can result in undersirable flow restrictions associated with the nipples that fit into the tubing ends. Attempts have been made to use external barbed fittings; however, polybutylene is so flexible and crack resistant that the barb would often not bite into the polybutylene, resulting in the tube blowing out of the fitting, under pressure. It was found that the polybutylene could be end-flared in a manner similar to flaring of copper tubing, and that standard brass fittings normally used with copper tubing would work quite well with the polybutylene flared ends; however, such fittings are expensive, the flaring step is time consuming, the material has to be "worked" considerably to produce the flare due to its stretch resistance, and the tube end has to be cut squarely for proper sealing with the fitting.

SUMMARY OF THE INVENTION

It is a major object of the invention to provide a tubing joint which overcomes the above as well as other problems with prior joints, particularly those wherein polybutylene tubing is employed. Basically, the improved joints utilize polybutylene tubing having rolled ends, and typically the end is rolled back and a flange on annular joint structure and which transmits pressure through the bead to define a seal and to lock the bead to the flange.

Basically, the joint comprises:

(a) relative flexible polybutylene tubing having a rolled end portion forming a bead, and (b) relatively rigid annular structure at opposite sides of the bead and pressurization the bead annularly and through the wall thickness thereof to form an annular seal and to retain the bead in position.

Such structure typically includes interconnected members, such as pin and box members, having opposed shoulders at opposite sides of the bead to transmit the pressurization; and either of the members may define the flange over which the bead is rolled. The flange may be tapered, or cylindrical; it may have a rounded terminal or a serrated face adjacent the bead; a ring or washer or tapered shoulder may be employed at the side of the bead opposite the flange; and the joint may be made up as a single joint or as multiple joints as in a tee or pipe bib configuration. Further, two such beads may be interengaged in abutment relation, with the associated tubings extending axially oppositely, to form a seal.

These and other objects and advantages of the invention, as well as the details of illustrative embodiments will be more fully understood from the following description and drawings, in which:

DRAWING DESCRIPTION

FIG. 1 is a perspective view showing a conventional flared tubing;

FIG. 2 is a perspective view showing polyethylene tubing with a rolled end portion;

FIG. 3 is a vertical section showing a joint utilizing the FIG. 2 rolled end portion;

FIG. 4 is a vertical section showing another joint using the FIG. 2 tubing rolled end portion;

FIG. 5 is an enlarged section of a portion of FIG. 3;

FIGS. 6 and 7 vertical sections showing additional modified joints embodying the FIG. 2 rolled end portion;

FIG. 8 is an exploded perspective view showing use of two FIG. 2 type rolled ends, in a joint;

FIG. 9 is a vertical section showing the FIG. 8 joint in assembled condition;

FIG. 10 is a view like FIG. 9, but showing a modified version of the joint;

FIG. 11 is a vertical sectional view of a joint embodying an internally folded version of the polybutylene pipe end;

FIG. 12 is a perspective view showing a tee connection with connector nuts;

FIG. 13 is an enlarged section on lines 13—13 of FIG. 12;

FIG. 14 is a vertical section on lines 14—14 of FIG. 13;

FIG. 15 is a bottom plan view on lines 15—15 of FIG. 13;

FIG. 16 is a perspective view of a male nut as employed in FIGS. 12 and 13;

FIG. 17 is a perspective view of a disassembled coupling and joint, employing an internal nut, with ratchet;

FIG. 18 is a side elevation of the FIG. 17 internal nut, with ratchet;

FIG. 19 is an end elevation on lines 19—19 of FIG. 18;

FIG. 20 is a side elevation of the coupling portion mounting a pawl for the nut ratchet;

FIG. 21 is an end elevation, in section, on lines 21—21 of FIG. 20;

FIG. 22 is a side elevation, partly in section, showing the FIG. 17 coupling and joint in assembled condition;

FIG. 23 is a perspective view of a hose bib embodying the invention, with the joint exploded;

FIG. 24 is side elevation of the joint shown in FIG. 23, in assembled condition;

FIGS. 25-28 are side elevations, in section, showing further modified joints.

DETAILED DESCRIPTION

FIG. 1 shows a conventional tubing 10 plastic or metallic, having a flared end portion 11. It suffers from the deficiencies mentioned above.

FIG. 2 shows a polybutylene tube 12 having a rolled end portion 13 forming a bead. End portion 13 extends back over the tubing material to form a recess 14, the end portion 13 being external. Typically, the wall thickness of the tube 12 and bead is between 0.010 and 0.060 inches, whereby the tube is quite flexible. Polybutylene tubing is formed from polybutylene resin, a high molecular weight polymer synthesized from butene — 1 monomer. Such polymers are flexible, crystalline isotactic polyolefins having a density of about 0.91. The tubing has excellent flexibility, toughness and abrasion resistance, and it possesses resistance to elevated use temperatures (up to 230° F.), good barrier properties, excellent electrical insulating characteristics and resistance to most chemical environments. See Witco Chemical Bulletin 100, listing pipe grade polybutylene, Product PB200, and film grade PB153.

The various joints illustrated in the drawings, and including polybutylene tubing with bead end portions, each include relatively rigid annular structure at opposite sides of the bead to pressurize the bead annularly and through the bead wall thickness, to form an annular seal as well as to retain the bead in position against blowout under pressure, for example. Further, the annular structure typically includes interconnected pin and box members having opposed shoulders at opposite sides of the head to pressurize same. For example, in FIG. 3 the structure includes pin and box members 16 and 17 having opposed shoulders 18a and 19a at opposite side of rolled back bead 13a on polybutylene tube 12a. Tapered shoulder 18a is formed by axially tapered annular flange 18 on the box members, and shoulder 19a is formed at the internally frusto-conical tapered end of the pin member 16. These relationships are shown in greater detail in FIG. 5, it being clear that the bead is rolled over the flange 18, i.e. the latter fully penetrates recess 14.

Note the localized annular region 20 of pressurization of the bead, due to the differential tapers of shoulders 18a and 19a. A bulge 21 forms in the bead, outwardly of the compressed region 20, and the rolled end is held in position against blowout. Note also that the diameter of bore 22 of the box member 17 is greater than the diameter of bore 16' of the pin member 16, the difference being about twice the wall thickness of pipe 12a. Thus, the diameter of tube bore 12' is about the same as the diameter of bore 16' of member 16. This prevents flow bore restrictions at the joint. Note also, the threaded interconnection at 23 between the two members 16 and 17.

The construction shown in FIG. 4 is basically the same as in FIGS. 3 and 5, except that the flange 18 is formed on member 17a, the pin member in this instance, and the member 16a is the box member, there being a threaded interconnection between these members at 23a. In both FIGS. 3 and 4, the interconnections 23 and 23a protect the bead from exterior exposure and possible damage, and the extent of thread make-up controls pressurization of the polybutylene tube bead, which form the joint seal.

The special configuration shown in FIG. 6 is generally usable with low fluid pressure and thin walled polybutylene tubing 12b. In this case, the flange 18b on member 17b is substantially cylindrical and has a rounded terminal 18b', which extends annularly. The bead 13b is retained against the radially outerside of the flange by the shoulder 19b which is internally rounded (in axial radial planes) to match the rounded terminal 18b'. Shoulder 19b is re-entrant into member 16b, as shown.

In FIG. 7 the bead 13c has double thickness extent at locations where the tube is rolled back and down against itself. The retaining structure includes members 16c and 17c having shoulders 18c and 19c at opposite sides of the double thickness, folded bead to transmit pressurization through same. Shoulders 18c and 19c may be serrated, as shown, to grip both walls (inner and outer) of the folded bead. Pocket 25 receives the bulging rounded extent 26 of the bead. FIG. 11 is somewhat similar to FIG. 7; however, in FIG. 11 the tube is radially inwardly folded back upon itself, whereas in FIG. 7 the tube is radially outwardly folded back on itself. Elements in FIG. 11 have numbers corresponding to those in FIG. 7, but with "d" suffixes.

In FIGS. 8 and 9, the joint 30 includes first and second flexible tubes 12e and 12ee made of polybutylene, having externally rolled end portions 13e and 13ee forming beads which face one another. A rigid ring 31 extends annularly and between the beads, and provides oppositely tapered shoulders 19e and 19ee engaging them. The beads are rolled over the flanges 18e and 18ee on members 17e and 16e, respectively. A box member 16ee associated with member 16e has threaded interconnection with the pin member 17e at 23e, whereby the beads are annularly and axially pressurized, via the flanges, to form annular seals. Note the tubes 12e and 12ee respectively lining the bores of members 16e and 17e, the tube bores being the same. A flange 131 on member 16ee engages the end of member 16e and clamps same, axially. A guide flange 32 on member 16e engages the bore 33 of member 16ee. The latter may be considered as a nut member, which aligns with a flange 34 on member 17e.

In FIG. 10 the construction is similar, corresponding members having the same members and "f" suffixes. In this case, members 16ee and 16e are integrated as single nut member 16f. Also, the annular ring 31 is eliminated, so that the beads 13f and 13ff are in annular, axially pressurized interengagement.

FIG. 12 shows a tee connection 40 with a tee member 41 having legs 37-39 coupled to the polybutylene tubes 12g, 12gg and 12ggg. The couplings may be the same, as exemplified in FIG. 3, wherein elements corresponding to those in FIG. 4 are given corresponding members, but with "gg" suffixes. The means coupling the members 17gg and 37 includes interfitting, axially facing cam shoulders 42a and 43a respectively on bosses 42, and on flanges 43. Bosses 42 are on member 17gg, and flanges 43 are on member 37. Such shoulders spiral about an axis 44 defined by the members, but are interrupted, circularly, whereby the members are made up or coupled in response to less than a complete turn of one member relative to the other. For example, the bosses 42 may be initially assembled axially through axial slots 45 in bosses 43 until the oppositely facing shoulders 42a and 43a are brought into circular registration, whereupon nut member 17gg' may be rotated relative to member 37 to tighten the interfitting cam shoulders 42a and 43a, effecting desired pressurization of the tube bead 13gg. Note cut-outs 46 in the receptacle portion 47 of member 37 to enable viewing of shoulder tightening, to made-up condition, and to facilitate molding.

FIGS. 17–22 illustrate the addition of interengaged ratchet and pawl elements 50 and 51 on the members to provide progressive ratcheting interlocking of the members in response to relative turning thereof. The coupling to the member may be as in FIGS. 13-16, whereby corresponding parts are given the same numbers, but with "h" suffixes. A pawl 51 on cantilever arm 52 is integral with member 17hh at point 53. It extends about axis 44hh and faces ratchet teeth 50h on ratchet 50 integral with member 37h. Teeth 50h extend radially, and spiral about axis 44hh in correspondence to spiraling of shoulders 42h and 43h, whereby the pawl has progressive detent or ratchet interengagement with the teeth as the members are relatively rotated, to provide interlock. Release of the pawl may be effected manually by axial displacement, during uncoupling of the members.

FIG. 23 shows a hose bib 60 and illustrates a simple and inexpensive means for directly connecting to the bib. The elements indicated by the bracket 61 may be similar to those of FIG. 3; however, FIG. 24 shows the made up connection. Note polybutylene tube 12i with bead 13i; members 17i and 16i; flange 18i, and threaded connection 23i.

FIG. 25 shows a coupling 70 wherein the lip 13kk of bead 13k is retained between a cylindrical and axial flange 18k on member 17k and the bore 71 of member 16k.

In FIG. 26, the coupling 80 includes a washer 81 between the end of hose member 16m and the bead 13m. The bead is rolled over a flange 18m on member 17m. In FIG. 27, the coupling 90 includes member 16p defining an annular edge which engages the bead 13p. Flange 18p on member 17p penetrates the bead recess. In FIG. 28 the coupling 95 includes a molded rubber or plastic washer 81a defining tapered shoulder 19r against which the bead 13r is clamped by flange 18r. The washer is located at the end of the hose member 16r.

The Witco Chemical Bulletin referred to above indicates that polybutylene has a Shore D hardness of about 50 after 4 days, and density of about 0.91 grams/cc after 3 days.

I claim:

1. In a beaded plastic tubing joint, the combination comprising:

a) relatively flexible polybutylene tubing having a rolled end portion forming a reversely turned bead, and b) relatively rigid annular structure at opposite sides of the bead and pressurizing the bead annularly and through the wall thickness thereof to form an annular seal, and to retain the bead in position, c) said structure including interconnected coaxial pin and box members having opposed shoulders at opposite sides of the bead, said shoulders effecting said pressurizing, the box member having an annular flange over which said bead is rolled, said flange forming one of said shoulders, said flange tapering toward an annular terminal which is convexly rounded in axial radial planes, said bead rolled over said terminal and extending frusto-conically to engage said one shoulder, said pin and box member opposed shoulders being differentially tapered to form a bulge in a portion of the pressurized bead that extends away from said flange terminal and away from the zone of closest approach of said shoulders.

2. The combination of claim 1 wherein the wall thickness of said tubing is between 0.010 and 0.060 inches 3. The combination of claim 1 wherein said flange tapers in axially radial planes and in the direction of penetration of the flange into the bead.

4. The combination of claim 1 including means releasably retaining said members in interlocked relation.

5. The combination of claim 1 wherein the tube extends in one of said members, the tube having a bore diameter approximately the same as the bore diameter of the other of said members.

6. The combination of claim 1 wherein said plastic consists of a high molecular weight polymer having a density of about .91 and a Shore D hardness of about 50.

* * * * *